UNITED STATES PATENT OFFICE.

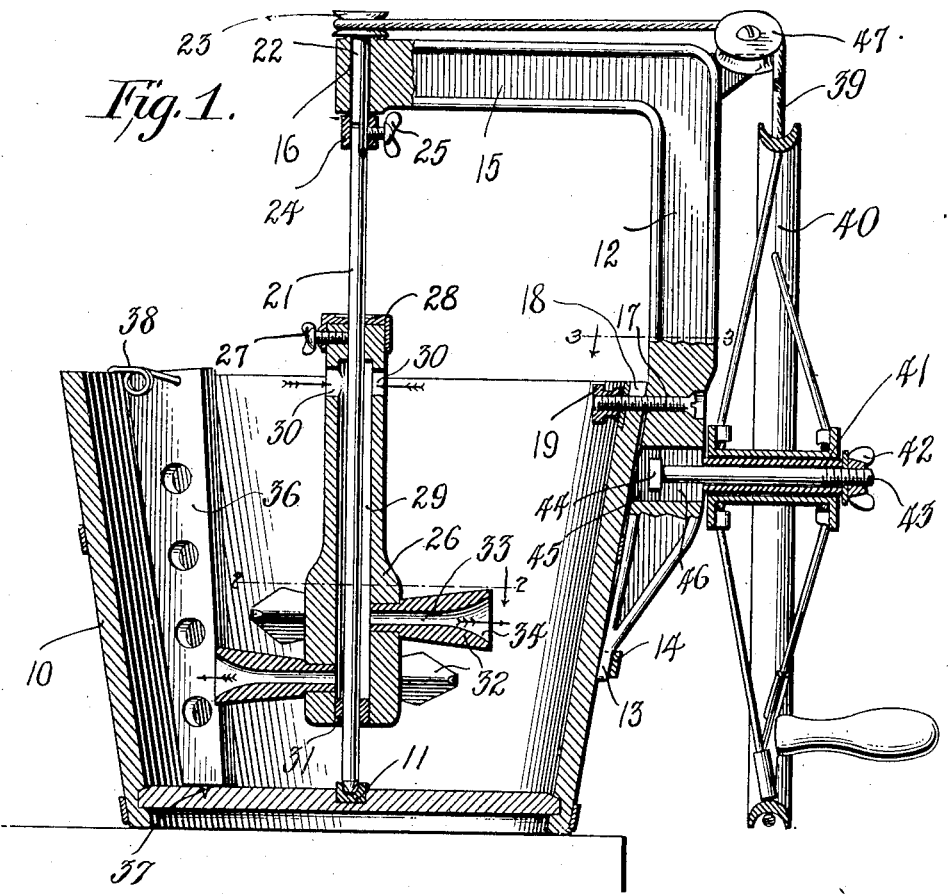
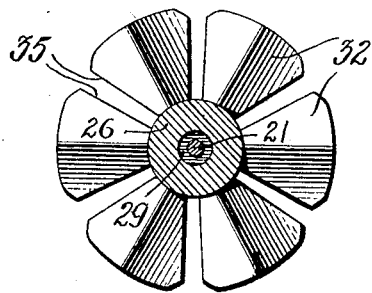
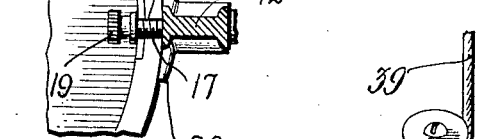

EDWIN H. BURNES, OF AMSTERDAM, NEW YORK.

AERATING-CHURN.

No. 878,339. Specification of Letters Patent. Patented Feb. 4, 1908.

Application filed November 29, 1907. Serial No. 404,412.

*To all whom it may concern:*

Be it known that I, EDWIN H. BURNES, a citizen of the United States, residing at Amsterdam, in the county of Montgomery and State of New York, have invented certain new and useful Improvements in Aerating-Churns, of which the following is a specification.

This invention relates to an improved churn construction of the type in which milk or cream operated upon is purified by aeration, pure air being introduced into the contents of the machine and distributed to the same during operation of churning, beating, or the like. While it is designed primarily for the purpose of purifying and separating milk or cream, the device is adapted also for use as a freezer for ice cream, ices, or the like, and also for mixing products such as custards, etc.

The particular objects aimed at in the present improvement are to secure a better form of aerating cylinder or dasher whereby the air is introduced and distributed and also the contents of the machine are more effectively stirred than has heretofore been accomplished; to improve the construction of driving mechanism and the mounting thereof especially adapted for use in this type of a machine, and also to provide improvements in deflectors or breakers for use in connection with the dasher for the purpose of breaking bubbles of air within the liquid, thereby preventing the same from rising to the top of the liquid.

The foregoing and other objects of the invention such as will be noted in the following description are obtained by the mechanism hereinafter specifically described and illustrated in the accompanying drawings, in which, Figure 1 is a vertical sectional view of an apparatus constructed in accordance with the present invention, certain parts being in elevation, and one of the deflectors being shown in perspective and positioned adjacent to the inner wall of the tub; Fig. 2 is a cross sectional view on the line 2—2 of Fig. 1, showing the beaters in plan; Fig. 3 is a detail view on the line 3—3 of Fig. 1 indicating the form of the supporting frame with respect to its means for attachment to the upper edge of the tub; Fig. 4 is a detail plan view of a portion of the supporting frame and the guide pulleys connected thereto over which a driving belt operates, and Fig. 5 is a detail perspective of one of the beaters.

Throughout the following description similar parts are referred to and indicated on the accompanying drawings by the same reference characters.

As a preferred embodiment of the invention there is provided a tub 10 of any suitable structure and form, the same being provided in its bottom with a step bearing 11. Mounted upon one side of the tub and projecting upwardly above the same is a supporting frame 12 of any suitable material such as metal. This frame terminates at its lower end in a point or horn 13 which is seated loosely within a socket 14 suitably secured to the tub. Said frame is provided at its upper portion with a horizontally extending arm 15 having at its end a vertically arranged eye or bearing 16. Intermediate of the said point 13 and the arm 15 the frame is provided with attaching means such as a bolt 17 which projects into or through a notch 18 in the upper edge of the tub. A binding nut 19 coöperates with the inner end of the bolt 17 for the purpose of securely holding the frame from movement. In order to prevent any lateral swinging or vibration of the frame the same is provided at 20 with laterally extending ears or lugs which conform to the outer periphery of the tub as indicated in Fig. 3. It will thus be seen that in order to secure the frame in place it is only necessary to slip the horn 13 into its socket and the bolt 17 into the notch 18, the ears or lugs 20 coming into place against the tub, and to secure the same the nut 19 is tightened.

A vertical shaft 21 is mounted upon the step 11 within the tub. The shaft but for its conical point which coöperates with said step bearing, and its shouldered upper end, which coöperates with a similarly shouldered short shaft section 22, is cylindrical throughout. Said short shaft 22 as indicated is journaled in the aforesaid bearing 16 and is provided upon its upper end with a grooved pulley 23. The connection between the shaft sections is of a peculiar character, the same including a collar 24 having a set screw 25 designed to clamp the collar rigidly to the said short shaft section 22 and to prevent the said shaft section from undue vertical displacement. As aforesaid the coöperating ends of the shaft sections are shouldered as indicated in Fig. 1, the joint lying preferably within the collar 24, and the main shaft section 21 not being rigidly secured by means of the collar. This coupling possesses the following advantages: First, by having a loose connection between the shaft sections, the main shaft section 21 is better adapted to accommodate itself, according to the rapid rotation which it is caused to make in operation, without interfering with the driving movements of the driving mechanism in any manner, and secondly by having such loose connection the disassembling of the machine for the purpose of cleansing is greatly facilitated, it being only necessary to loosen the nut 19 to remove the entire supporting frame, the driving mechanism connected thereto, and the short shaft 22 and the collar connected thereto from the vertical shaft 21 and the dasher. Upon removal of the frame the shaft 21 and dasher are free to be lifted out.

The dasher comprises a cylinder or barrel 26 having a bore longitudinally therethrough in which the shaft 21 is located, the same being secured to the shaft in adjusted position by suitable means such as the set screw 27 coöperating with the thimble 28 at its upper end. The barrel is counterbored through its lower end as indicated at 29, the counterbore extending up nearly to the upper end, and communicating therewith are inlet air ports 30. Seated within the lower end of the counterbore and coöperating with the shaft 21 is a suitable sleeve 31. Secured to the barrel 26 and extending outwardly therefrom substantially in horizontal planes are a plurality of beaters 32 of peculiar form.

Each of the beaters 32 has a central bore 33 communicating at its inner end with the counterbore 29 and being outwardly flared at its outer end 34. The outer end of the beater is tapered both horizontally and vertically as plainly indicated in the drawings, the upper and lower surfaces of the same meeting substantially in radial edges 35. The beaters 32 are preferably arranged in parallel planes and with the members thereof in staggered relation. As thus described the liquid in the tub will be caused to partake of a wave like motion due to the shape of each beater and the arrangement of all of the beaters. The outer ends of the beaters having a high velocity tend to cause a vacuum in the region of the flares 34 and this creates a suction of air into and through the ports 30 downwardly through the beaters and into the liquid. In order to adjust the cylinder 26 with relation to the shaft 21 it is necessary to adjust the set screw 27, and since the shaft 21 is of uniform shape, by loosening the set screw 27 the cylinder may be removed entirely therefrom for the purpose of cleansing the same.

As hereinbefore premised, I provide within the tub and between the wall of the same and the dasher as many breakers or deflectors 36 as may be necessary, only one of which is shown, and a description of it will suffice for all. Each breaker 36 consists of a substantially vertical body portion having transverse holes and is provided at its lower end with a needle point 37 which penetrates the bottom of the tub for the purpose of preventing lateral displacement thereof. The upper end of the breaker is provided with a spring clip 38, which engages the upper edge of the tub, holding the same in place.

The driving means for the vertical shaft includes an endless belt 39 coöperating with the pulley 23, and driven by a wheel 40 in a well known manner. The wheel 40 is journaled upon a sleeve 41 which sleeve together with a thumb nut 42 and bolt 43 constitutes a clamping means for securing the said wheel in a vertical plane. The end of the bolt 43 opposite to the thumb nut 42 is provided with a head 44 seated within a socket 45 in the frame 12, and the body of the bolt is adjustable vertically in a slot 46 whereby the belt 39 may be tightened as desired. The wheel 40 operating in a vertical plane, and the driven pulley 23 operating in a horizontal plane, I provide suitable direction pulleys 47 as indicated. After the wheel 40 is properly positioned with reference to the belt it is unnecessary to modify the same, it being unnecessary to loosen its securing means for the purpose of disassembling the device during ordinary conditions.

Having thus described the invention, what is claimed as new, is,

1. In apparatus of the class described, the combination of a receptacle, a step bearing in the bottom thereof, a vertical shaft supported on said bearing for rapid rotation, a supporting frame detachably secured to the receptacle, driving means carried by said frame and including a short shaft section having a loose driving connection with said vertical shaft, and a dasher mounted on said vertical shaft and comprising a counterbored barrel having air inlet ports at its upper end and a plurality of beaters attached to and projecting outwardly from said barrel in parallel horizontal planes, each of said beaters having a central bore communicating with the aforesaid counterbore, the outer end of said bore being flared, and the outer end of the beater being widened both horizontally and vertically, for the purposes set forth.

2. In combination, a receptacle, a shaft therein, a dasher arranged thereon for rapid rotation, a supporting frame detachably secured to the receptacle and having a horizontal arm, said arm having a vertical bearing above said shaft, a short shaft section journaled in said bearing and having a loose connection with the aforesaid shaft, a bolt mounted in said frame for vertical adjustment, a sleeve surrounding said bolt, means to clamp said sleeve and bolt to the frame in adjusted position, and driving means for said dasher and shaft sections including a wheel journaled on said sleeve, substantially as set forth.

In testimony whereof I affix my signature in presence of two witnesses.

EDWIN H. BURNES.

Witnesses:
A. BRUCE HOLMAN,
HENRY LOPE.